(12) United States Patent
Cross

(10) Patent No.: US 6,998,061 B1
(45) Date of Patent: Feb. 14, 2006

(54) IN-SITU EXCHANGE BIASED GMR HEAD FOR ULTRA-HIGH DENSITY RECORDING WITH PINNING LAYER-ONLY ANNEAL

(75) Inventor: Ralph W. Cross, Lyons, CO (US)

(73) Assignee: Maxtor Corporation, Longmont, CO (US)

( * ) Notice: Subject to any disclaimer, the term of this patent is extended or adjusted under 35 U.S.C. 154(b) by 112 days.

(21) Appl. No.: 10/342,686

(22) Filed: Jan. 14, 2003

Related U.S. Application Data

(60) Provisional application No. 60/408,659, filed on Sep. 6, 2002.

(51) Int. Cl.
G11B 5/127 (2006.01)
B44C 1/22 (2006.01)

(52) U.S. Cl. .............................. 216/22; 216/22; 216/66; 29/603.14; 360/113

(58) Field of Classification Search .................. 216/22, 216/66; 360/113; 148/108; 29/603.14
See application file for complete search history.

(56) References Cited

U.S. PATENT DOCUMENTS

| | | | |
|---|---|---|---|
| 4,785,366 A | 11/1988 | Krounbi et al. .............. 360/113 |
| 5,764,445 A * | 6/1998 | Torng et al. ............ 360/327.32 |
| 6,033,491 A * | 3/2000 | Lin ............................. 148/108 |
| 6,141,191 A | 10/2000 | Lee ........................... 360/324.1 |
| 6,185,081 B1 * | 2/2001 | Simion et al. ............ 360/327.3 |
| 6,291,087 B1 * | 9/2001 | Xiao et al. ................... 428/692 |
| 6,326,637 B1 | 12/2001 | Parkin et al. ................... 257/9 |
| 6,413,325 B1 | 7/2002 | Shimazawa et al. ......... 148/108 |
| 6,430,015 B1 | 8/2002 | Ju et al. ................. 360/327.32 |
| 6,447,935 B1 * | 9/2002 | Zhang et al. ................ 428/692 |
| 6,621,667 B1 * | 9/2003 | He et al. ................ 360/324.12 |
| 6,857,180 B1 * | 2/2005 | Horng et al. ............. 29/603.14 |

* cited by examiner

*Primary Examiner*—Shamim Ahmed
(74) *Attorney, Agent, or Firm*—Robert G. Crouch; Marsh Fischmann & Breyfogle, LLP

(57) ABSTRACT

A process for manufacturing a GMR read element of a read/write head for a disk drive having pattern exchange biasing for longitudinal stabilization. An in situ or ex situ GMR anneal of the pinned layer occurs after only the AFM pinning layer and the first pinned layer have been deposited. After the anneal, the upper surface of the first pinned layer is milled with low energy ions to remove oxidation and SIMS inspection determines the amount of oxidation removed and the amount of surface modification required for smoothing. After this, the remaining layers are deposited through the exchange bias layer. A second anneal is then performed at a somewhat lower temperature than the GMR anneal. In this manner, the entire stack is not subjected to the GMR anneal, the upper surface of the first pinned layer can be optimized, and the interface between the free layer and the exchange biased layer is not disturbed.

43 Claims, 4 Drawing Sheets

IN-SITU EXCHANGE BIASED GMR HEAD FOR ULTRA-HIGH DENSITY RECORDING WITH PINNING LAYER-ONLY ANNEAL

CROSS-REFERENCE TO RELATED APPLICATIONS

This application claims priority from U.S. Provisional Patent Application No. 60/408,659, filed Sep. 6, 2002, entitled "In-Situ Exchange Biased GMR Head For Ultra-High Density Recording With Pinning Layer-Only Anneal", the contents of which are incorporated herein by reference.

FIELD OF THE INVENTION

This application relates to a method for producing magnetoresistive (MR) heads for data storage applications, particularly giant magnetoresistive (GMR) heads having pattern exchange biasing for longitudinal stabilization.

BACKGROUND OF THE INVENTION

In hard disk drives, data is written to and read from magnetic recording media, herein called disks, utilizing magnetoresistive (MR) transducers commonly referred to as MR heads.

Typically, one or more disks having a thin film of magnetic material coated thereon are rotatably mounted on a spindle. An MR head mounted on an actuator arm is positioned in close proximity to the disk surface to write data to and read data from the disk surface.

During operation of the disk drive, the actuator arm moves the MR head to the desired radial position on the surface of the rotating disk where the MR head electromagnetically writes data to the disk and senses magnetic field signal changes to read data from the disk.

Usually, the MR head is integrally mounted in a carrier or support referred to as a slider. The slider generally serves to mechanically support the MR head and any electrical connections between the MR head and the disk drive. The slider is aerodynamically shaped, which allows it to fly over and maintain a uniform distance from the surface of the rotating disk.

Typically, an MR head includes an MR read element to read recorded data from the disk and an inductive write element to write the data to the disk. The read element includes a thin layer of magnetoresistive sensor stripe sandwiched between two magnetic shields that are electrically connected together but are otherwise isolated. A constant current is passed through the sensor stripe, and the resistance of the magnetoresistive stripe varies in response to a previously recorded magnetic pattern on the disk. In this way, a corresponding varying voltage is detected across the sensor stripe. The magnetic shields help the sensor stripe to focus on a narrow region of the magnetic medium, hence improving the spatial resolution of the read head.

Earlier MR sensors operated on the basis of the anisotropic magnetoresistive (AMR) effect in which a component of the read element resistance varied as the square of the cosine of the angle between the magnetization and the direction of sense current flowing through the read element. In this manner, because the magnetic field of the recording media would effect the magnetization direction within the read element, the change in resistance could be monitored to determine the type of external magnetic field applied by the magnetic recording medium. Most current disk drive products utilize a different, more pronounced magnetoresistive effect known as the GMR or spin valve effect. This effect utilizes a layered magnetic sensor that also has a change in resistance based on the application of an external magnetic field. While multiple layers are typically used, the most relevant layers are a pair of ferromagnetic layers separated by an electrically conductive non-magnetic spacer layer such as copper. One of the ferromagnetic layers known as the "free" layer is a soft magnetic material whose magnetization is changed by the external magnetic field caused by the close proximity of the magnetic recording medium. The other ferromagnetic layer, known as the "pinned" layer, is also a soft magnetic material that has its magnetization direction fixed by an adjacent layer known as the "pinning" layer. A layer of antiferromagnetic material is typically used as the pinning layer. A sense current is passed from one end of the ferromagnetic and conductive layers to the opposite end of those same layers. The resistance of this tri-layer structure is proportional to the magnetization angle between the two ferromagnetic layers. Since one of the layers has a magnetization angle that is pinned and the other ferromagnetic layer has a magnetization that can vary in response to the magnetic field from an adjacent magnetic recording medium, the resistance of the tri-layer structure is proportional to that magnetic field from the recording medium. It has been discovered that this tri-layer structure behaves in this manner because of a spin dependent scattering of electrons, the scattering being dependent on the spin of the electron and the magnetization direction of the layer through which the electron passes.

As can be appreciated, the process of manufacturing GMR heads is very complex, involving the serial deposition of multiple layers on top of one another. At multiple times during the process of depositing the multiple layers, other processing steps such as etching away portions of a layer with a chemical, milling away portions of a layer by bombarding ions onto the layer, polishing a layer to optimize the surface thereof, and annealing the existing stack of layers by heating the same to a high temperature may be employed.

One undesirable characteristic of MR sensors is noisy response due to the buckling magnetic domain patterns in the sensor. This noise is often referred to as Barkhausen noise. This is typically minimized in MR sensors by the application of a small magnetic field longitudinally to the magnetic sensor that results in a single magnetic domain for the sensor. Barkhausen noise is typically suppressed in most current commercial products by hard biasing the MR sensor with permanent magnet regions that abut either end of the tri-layer sensor. Unfortunately, the abutted junction permanent magnet approach for longitudinal biasing does have its disadvantages. First of all, the magnetic field from the permanent magnet extends well past the boundary of the permanent magnet with the free layer. Because the magnetic field extends deep into the free layer, the sensitivity within the free layer to external magnetic fields from the magnetic recording medium is reduced. This reduced sensitivity is very undesirable in a GMR head. Second, stray fields from the permanent magnet tend to also be directed toward the shields on either side thereof, which also reduces sensitivity and increases noise. Third, the central area of the free layer tends not to be sufficiently biased. Lastly, the large granular structure within the permanent magnets makes precise and accurate stabilization with permanent magnets difficult.

Another type of longitudinal bias or stabilization that has been proposed is known as pattern exchange biasing (PEB). PEB involves creating the longitudinal bias only at two opposite ends of the tri-layer sensor structure. These biased-end sections provide only a small field to the remainder of the sensor, which is sufficient to largely prevent buckling domain patters so as to minimize Barkhausen noise while retaining the signal sensitivity of the central region of the sensor. This is accomplished by providing a layer of exchange material, such as an antiferromagnetic material like platinum manganese (PtMn). In this case, the principle of exchange results in the magnetic dipoles in the adjacent antiferromagnetic layer that are closest to the free layer causing the magnetic dipoles in the free layer to point in the same direction due to magnetic coupling. Because the free layer is ferromagnetic material, all of the magnetic dipoles in the layer will line up in the same direction as a result of this exchange biasing from the antiferromagnetic material (AFM). Because the central section of the magnetic sensor stripe is free of exchange material, the magnetization direction in that active region is free to rotate with the applied field from the adjacent magnetic recording media. GMR sensors using PEB for longitudinal stabilization have a much higher output, quieter response, and no stray fields, as compared to permanent magnet stabilized heads. Calculations show that the expected output increase of PEB over permanent magnet stabilization is approximately 60%–100%.

Most read head manufacturers desire to implement PEB and have been trying to do so, but have had trouble with the process complexity required by PEB. To date, few if any commercial disk drives include read/write heads with pattern exchange biasing of the GMR sensor. There are several reasons for this. First, it has been difficult to provide a clean and optimal surface on the free layer for depositing the patterned areas of antiferromagnetic material. When there is not a good surface, the exchange effect is significantly decreased. The typical manner for applying the patterned antiferromagnetic material is to first apply a column of photoresist material on top of a portion of the free layer. The remaining portions on top of the free layer, that will eventually have the antiferromagnetic material applied thereto, are then milled with argon ions to condition the surface of the free layer. The most critical area for the PEB is right at the boundary layer or edge of the antiferromagnetic material that will be deposited against the photoresist column. Unfortunately, because of the presence of the column, an effect known as "shadowing" can reduce the amount of ion milling of that portion of the surface and can also allow some of the milled material to collect in that area. When the AFM material is subsequently deposited, the exchange effect is decreased in the are next to the first photoresist material. Of course, the photoresist material is then lifted off. Since the free layer is not pinned well in this region, the resulting GMR sensor tends to pick up signals from adjacent tracks on the magnetic recording media. These side lobes tend to add noise to the signal from the GMR sensing element. In addition, the shadowing at the edge of the exchange layer produces a poor interface which leads to unstable performance and poor thermal stability.

In addition, there is an issue with the antiferromagnetic material that is used in the PEB technique. It should first be understood that a high temperature anneal process is required to set the direction for the pinning layer (also AFM material) to pin the pinned layer. This anneal process may be at 240° C. for six hours, for example. Because it is required that the magnetization direction of the pinned layer be different from (and preferably orthogonal to) the magnetization direction of the free layer, the annealing process for the pin layers is performed prior to application of the PEB AFM material. Subsequently, the antiferromagnetic materials are deposited and it is then necessary to anneal this material so as to set the magnetization direction of the free layer. Of course, since the entire stack is exposed to this second anneal process, it must not affect the magnetization direction in the pin layers or the device will not function. For this reason, there has been a fair amount of work in recent years with low blocking temperature AFM materials. Such materials can be annealed at a relatively lower temperature so that the AFM material can be set to a particular magnetization direction without affecting the pin layers. Unfortunately, these low blocking temperature AFM materials do not turn out to be stable in operational conditions. It should be understood that in operational conditions with current flowing through the sensor, the temperature of the sensor can become elevated to a point where the PEB AFM material may change its direction of magnetization so that the longitudinal biasing of the free layer no longer occurs. As this happens, the free layer will begin to break into the previously-described magnetic domains and the GMR sensor will have an undesirably high amount of Barkhausen noise.

A second technique for creating the PEB longitudinal stabilization is with the use of a reactive ion etch (RIE). With this process, the pin layers are deposited, followed by the free layer and then by a protective layer. An annealing process is then performed to set the pin layer. The protective layer is then removed with argon ion milling and an AFM material layer is deposited on top of the free layer, followed by a conductor layer on top thereof. The RIE process is then used to trench out the conductor and AFM material down to the free layer to expose a portion thereof A second anneal process can then be performed to set the PEB AFM material. Unfortunately, there are problems with this approach. When the protective layer is being removed with the argon milling, the plus or minus 5 angstrom resolution of the milling process and the 25 angstrom thickness of the free layer can result in either not removing enough of the protective layer (so that the interface between the free layer and the AFM PEB material is not clean) or removing too much of the free layer (which can effect the performance of the GMR's sensor).

As can be seen, there are many challenges that remain to be resolved before PEB longitudinal stabilization of GMR sensors is commercially feasible. It is against this background and a desire to improve on the prior art that the present invention has been developed.

SUMMARY OF THE INVENTION

In view of the foregoing, a broad objective of the present invention is to increase the sensitivity of GMR heads. Another objective of the present invention is to decrease noise in GMR heads. A further objective is to provide a method of producing pattern exchange biased GMR heads with improved longitudinal stabilization. A still further objective is to provide a method of producing pattern exchange biased GMR heads with improved longitudinal stabilization without compromising other characteristics of the GMR head.

In carrying out these and other objectives, features, and advantages of the present invention, a method is provided for producing a read element of a read/write head for a disk drive. The method includes depositing a pinning layer, depositing a pinned layer, and annealing the partial stack while applying a magnetic field in a first direction. Then, the method includes depositing an electrically-conductive spacer layer, depositing a free layer, depositing an exchange bias layer, and annealing the stack while applying a magnetic field in a second direction, different than the first direction.

The pinned layer deposited before the first anneal may be the first pinned layer in a synthetic pinned layer structure, wherein the remaining layers of the synthetic pinned layer structure are deposited subsequent to the first anneal. The first anneal may be performed in situ or ex situ.

The method may further include milling the upper surface of the pinned layer after the first anneal. The milling may be a low energy ion milling operation. The method may also further include smoothing the upper surface of the pinned layer after milling the upper surface of the pinned layer.

The method may further include smoothing the upper surface of the pinned layer after the first anneal. The smoothing may include ion beam oxidation or a gas clustering technique.

The method may further include etching away a portion of the exchange bias layer to leave a pattern of exchange bias material and then depositing insulator material where the portion of the exchange bias layer was etched away. The etching may be performed with reactive ions.

The exchange bias layer may include platinum manganese or any high blocking temperature material that can be annealed at a temperature that is less than the temperature that would change the magnetization direction of the pinned layer.

The present invention is also related to a method for producing a read element of a read/write head for a disk drive, with the method including depositing a pinning layer, depositing a pinned layer, and annealing the partial stack while applying a magnetic field in a first direction prior to depositing other layers. Then, the method includes depositing an electrically-conductive spacer layer and depositing a free layer.

The present invention is also related to a method for producing a read element of a read/write head for a disk drive, with the method including depositing a pinning layer, depositing a pinned layer, and setting the magnetization direction of the pinned layer. Then, the method includes depositing an electrically-conductive spacer layer, depositing a free layer, depositing an exchange bias layer, and setting the magnetization direction of the free layer.

The present invention is also related to a method for producing a read element of a read/write head for a disk drive, with the method including depositing a pinning layer, depositing a first pinned layer of a synthetic pinned layer structure, and annealing the pinning layer while applying a magnetic field in a first direction to the first pinned layer, to set the magnetization direction of the first pinned layer in the first direction. The method further includes milling the upper surface of the first pinned layer after the setting of the magnetization direction of the first pinned layer, smoothing the upper surface of the pinned layer after milling the upper surface of the pinned layer, and then depositing the remaining layers of the synthetic pinned layer structure. The method also includes depositing an electrically-conductive spacer layer, depositing a free layer, depositing an exchange bias layer, and annealing the exchange bias layer while applying a magnetic field in a second direction, different than the first direction, to the free layer, to set the magnetization direction of the free layer in the second direction. The method also includes etching away a portion of the exchange bias layer to leave a pattern of exchange bias material and then depositing insulator material where the portion of the exchange bias layer was etched away.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with disk drives, it should be expressly understood that the present invention might be applicable to other applications where longitudinal stabilization of a magnetoresistive sensor is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

Figure 1:
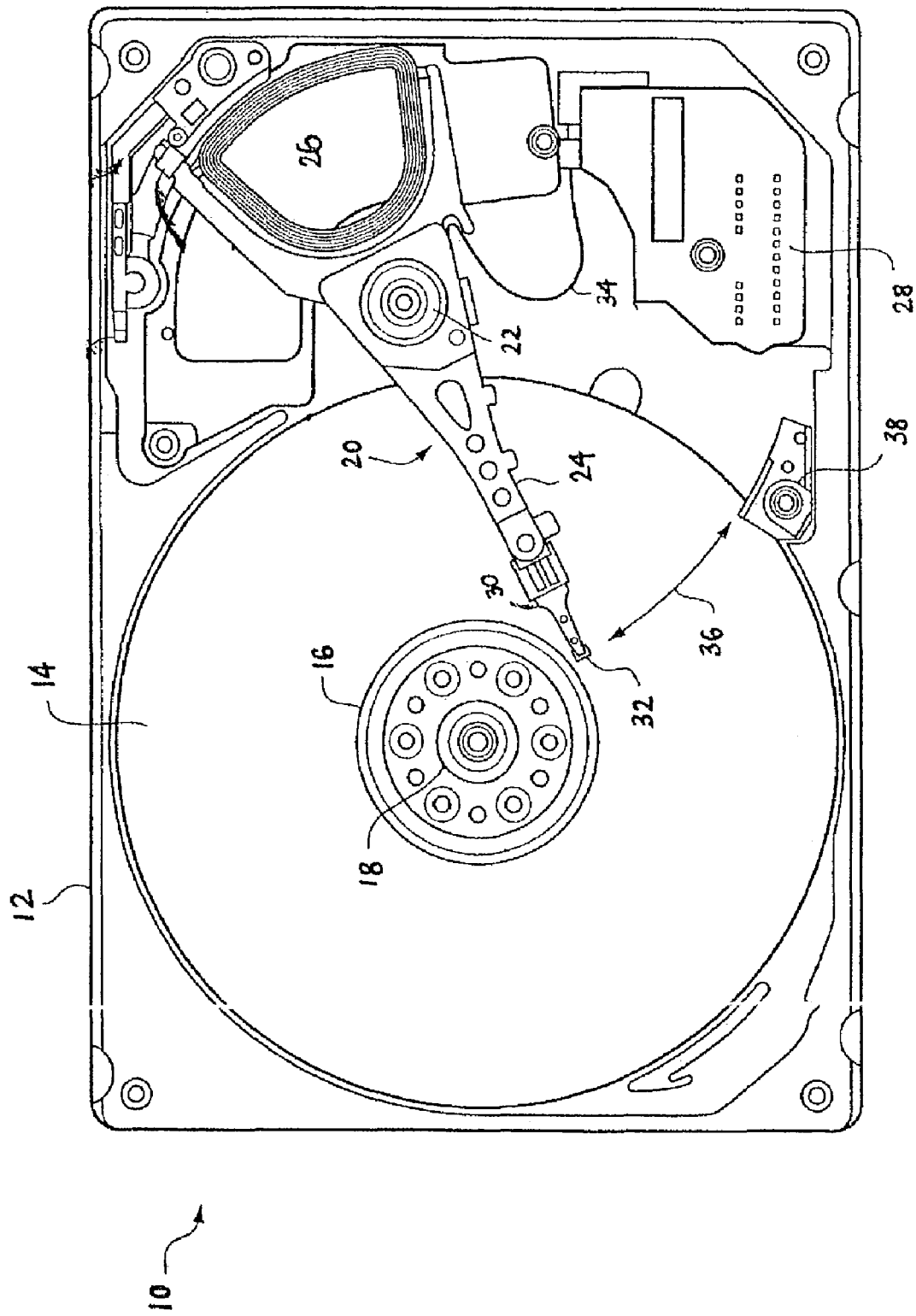
FIG. 1 is a top view of a disk drive that utilizes a head of the present invention.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 2:
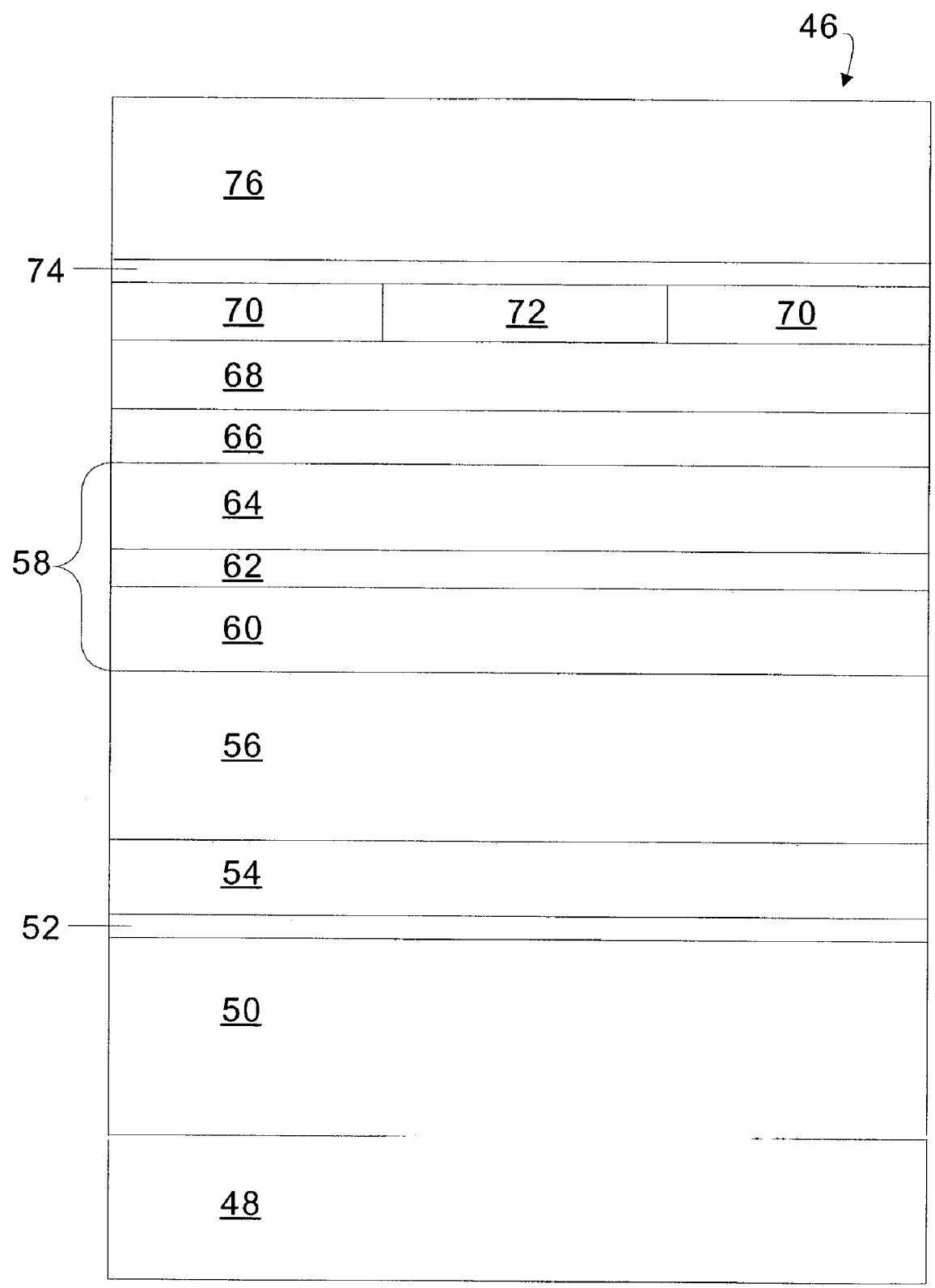
FIG. 2 is a general schematic view of a read element manufactured according to the present invention.

FIG. 2 illustrates a read element 46 of the head on the slider 32. As can be seen, the read element 46 is a multi-layer element manufactured by depositing thin film layers on top of thin film layers. As illustrated and described herein, certain layers, such as most seed layers, conductors, and so forth, are omitted for ease of illustration and understanding. Instead, the most relevant layers are described herein. The read element 46 first includes a suitable substrate 48 which may be of conventional construction. On top of the substrate 48, a first magnetic shield layer 50 is deposited. Next, a thin gap layer 52 is deposited. The gap layer is electrically insulating and provides a gap between the magnetic shield and the magnetic GMR sensor adjacent thereto. On top of the gap layer 52, a seed layer 54 is deposited. The seed layer 54 may be composed of nickel iron chromium (NiFeCr). On top of the seed layer 54, a pinning layer 56 is next deposited. The pinning layer 56 may be composed of platinum manganese (PtMn), an antiferromagnetic material that can serve to pin the magnetic direction of the next adjacent layer. Adjacent to the pinning layer 56 is an artificial pinned layer structure 58, which as shown in this simplified example may be a tri-layer arrangement including a first pinned layer 60, an anti-parallel coupling layer 62, and a second pinned layer 64. The first and second pinned layer 60 and 64 may be composed of cobalt iron (CoFe). The anti-parallel coupling layer 62 may be composed of ruthenium (Ru). On top of the drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read/write technologies such as anisotropic magnetoresistive (AMR), giant magnetoresistive (GMR), and tunneling magnetoresistive (TuMR), other magnetoresistive technologies, or other suitable technologies. AMR is due to the anisotropic magnetoresistive effect with a normalized change in resistance ($\Delta R/R$) of 2–4%. GMR results from spin-dependent scattering mechanisms between two magnetic layers (or more). The typical use in recording heads is the spin valve device that uses a free layer to detect external fields, and a pinned magnetic layer. The normalized change in resistance is typically 8–12%, but can be as large as 15–20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12–25%. The term magnetoresistive is used in this application to refer to all these types of magnetoresistive sensors and any others in which a variation in resistance of the sensor due to the application of an external magnetic field is detected. The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14.

Terminating the rotation of the data storage disk(s) 14 in this type of disk drive configuration would then result in the slider(s) 32 actually establishing contact with or "landing" on their corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

FIG. 2 illustrates a read element 46 of the head on the slider 32. As can be seen, the read element 46 is a multi-layer element manufactured by depositing thin film layers on top of thin film layers. As illustrated and described herein, certain layers, such as most seed layers, conductors, and so forth, are omitted for ease of illustration and understanding. Instead, the most relevant layers are described herein. The read element 46 first includes a suitable substrate 48 which may be of conventional construction. On top of the substrate 48, a first magnetic shield layer 50 is deposited. Next, a thin gap layer 52 is deposited. The gap layer is electrically insulating and provides a gap between the magnetic shield and the magnetic GMR sensor adjacent thereto. On top of the gap layer 52, a seed layer 54 is deposited. The seed layer 54 may be composed of nickel iron chromium (NiFeCr). On top of the seed layer 54, a pinning layer 56 is next deposited. The pinning layer 56 may be composed of platinum manganese (PtMn), an antiferromagnetic material that can serve to pin the magnetic direction of the next adjacent layer. Adjacent to the pinning layer 56 is an artificial pinned layer structure 58, which as shown in this simplified example may be a tri-layer arrangement including a first pinned layer 60, an anti-parallel coupling layer 62, and a second pinned layer 64. The first and second pinned layer 60 and 64 may be composed of cobalt iron (CoFe). The anti-parallel coupling layer 62 may be composed of ruthenium (Ru). On top of the artificial pinned layer structure 58, a conductor layer 66 is placed, the conductor layer 66 being composed of copper (Cu). This conductor layer 66, also known as the copper spacer layer, needs to be at a desired thickness, since if it is too thin there can be magnetic coupling between the adjacent layers and if it is too thick the GMR effect decreases to nothing. A free layer 68 is adjacent to the conductor layer 66 and may be composed of CoFe. Alternatively the free layer may be a bi-layer, one being NiFe and one being CoFe, or a single layer of CoFeB or CoFeNi, or any other suitable material(s). On top of the free layer 68, there are patterned areas of an exchange bias material 70 and a central area of an insulator 72. The exchange bias material 70 may be an AFM material such as PtMn like the pinning layer 56. On top of the layer including the exchange bias material 70 and the insulator 72, there is a narrow gap layer 74 and then a second magnetic shield 76.

Figure 3:
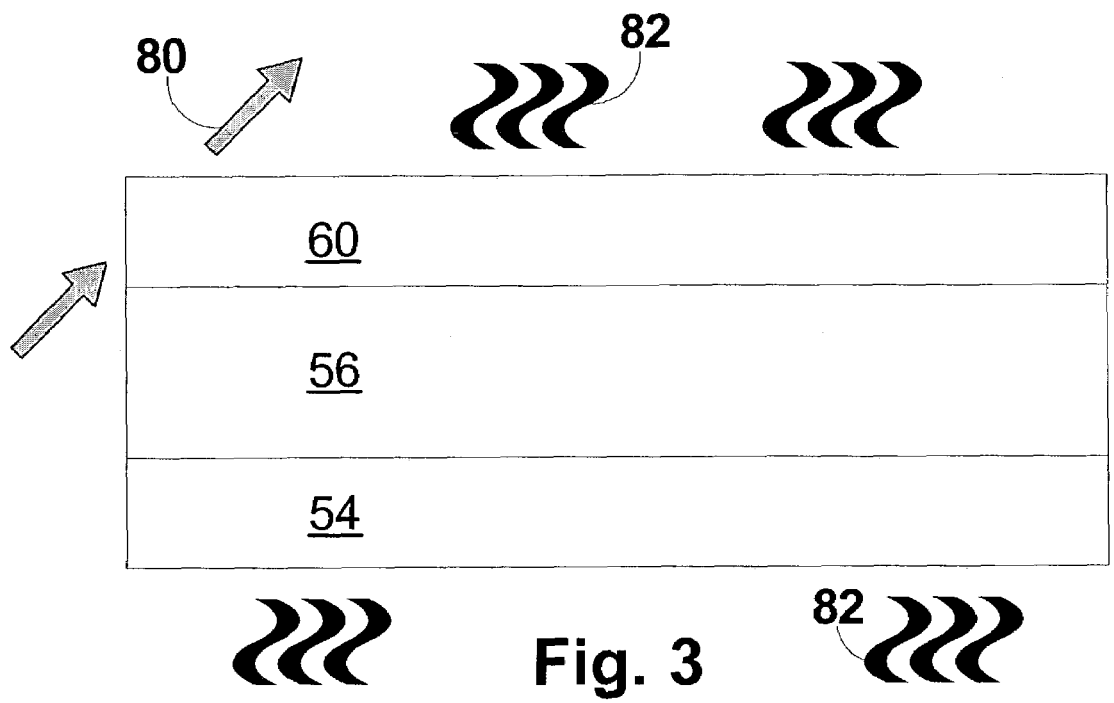
FIG. 3 is a portion of the read element of FIG. 2 at an early stage in the manufacturing process, showing an annealing step of the layers that have already been deposited at that point.

Rather than depositing all the layers in the read element 46 up through the free layer 68 prior to doing the first anneal, known as the GMR anneal, the present invention performs this first anneal at a different point in the manufacturing process. As is shown in FIG. 3, which omits certain layers such as substrate and seed layers and so forth, a partial stack that includes the seed layer 54, the pinning layer 56, and the first pinned layer 60 is shown in an annealing process. A magnetic field 80 is applied to the partial stack while heat is applied, as depicted by lines 82. This annealing process may include a magnetic field of 8 KOe and temperatures of 240° to 280° C. for 4 to 8 hours. The annealing process can be performed either in situ or ex situ. For the in situ alternative, the partial stack is left in the deposition or vacuum chamber and quartz heaters or a rapid-thermal anneal (RTA) oven can be used to heat the chamber while the magnetic field 80 is applied to the partial stack. Alternatively, the ex situ anneal can be done in a separate oven using existing processes.

Figure 4:
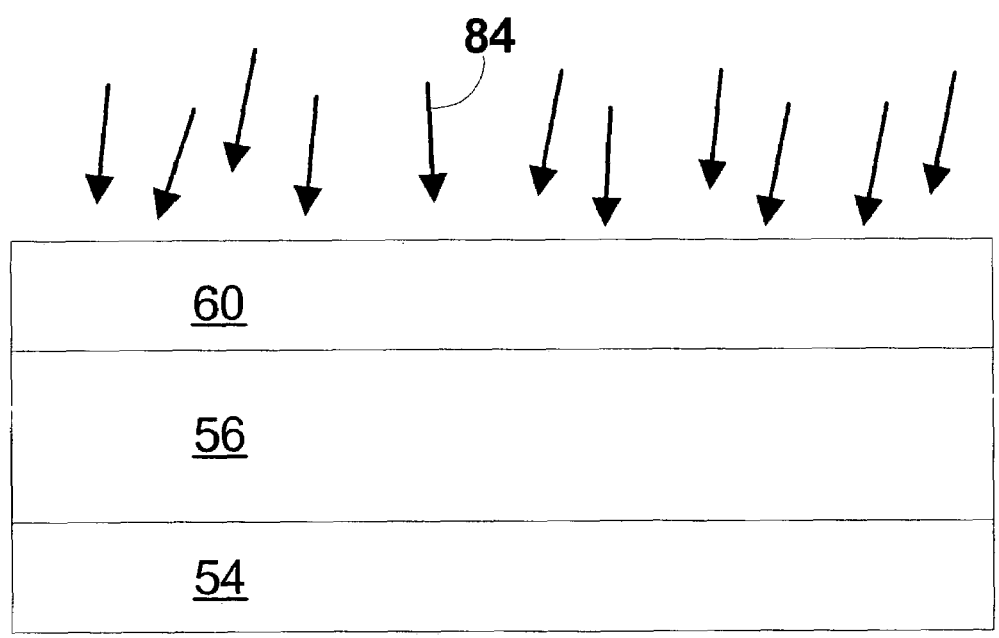
FIG. 4 shows the same layers as in FIG. 3 and shows a subsequent manufacturing process in which oxidation is being removed with a low-energy ion mill.

For either case, the top of the CoFe first pinned layer 60 will become partially oxidized by the annealing process. Of course, for the in situ anneal, the amount of oxide will be less than for the ex situ. As in FIG. 4, the partial stack is then subjected to a low energy ion milling process to eliminate the oxidation. The first pinned layer 60 can be initially deposited slightly thicker than desired to compensate for the amount of material removed due to the milling process. The bombardment of the upper surface of the first pinned layer 60 with low energy ions is shown by the arrows 84 in FIG. 4. Better control of the milling process can be accomplished with a low energy ion beam with SIMS (Secondary Ion Mass Spectrometry) detection if possible. Most GMR sputtering systems have an advanced ion mill chamber. The SIMS detection allows for the determination of the amount of oxide left on the upper surface of the first pinned layer 60. In addition, the SIMS detection can determine the extent to which the upper surface requires additional treatment. This treatment can include surface modification for roughness to smooth the surface. This modification treatment may include ion beam oxidation (IBO), gas clustering techniques, or other suitable techniques. One reason the surface modification may be required is because the PtMn grains are very large after the GMR anneal, which adds a lot of roughness to the subsequent layers.

Once the partial stack has been annealed to set the magnetization direction of the first pinned layer 60, the oxidation has been removed, and the surface has been modified, the remainder of the stack can be deposited. Previously described layers 62, 64, 66, and 68 are next deposited onto the partial stack. Then, the exchange bias layer 70 is deposited on top of the free layer 68. Prior to patterning the exchange bias layer 70, a second anneal is performed to set the magnetization direction for the portions of the free layer 68 adjacent to the exchange bias layers 70 (it is not a requirement, however, that the second anneal be performed prior to the second anneal). Since the remainder of the stack is deposited in situ, including and through the exchange bias layer 70, an excellent interface is provided between the free layer 68 and the exchange bias layer 70. This is because there is no interruption between the depositing of the free layer 68 and the exchange bias layer 70, in contrast to the prior art GMR anneal in which an anneal was performed before the exchange bias layer was deposited. Thus, no milling of the free layer 68 is needed because there has been no build up of oxidation on the free layer 68.

Figure 5:
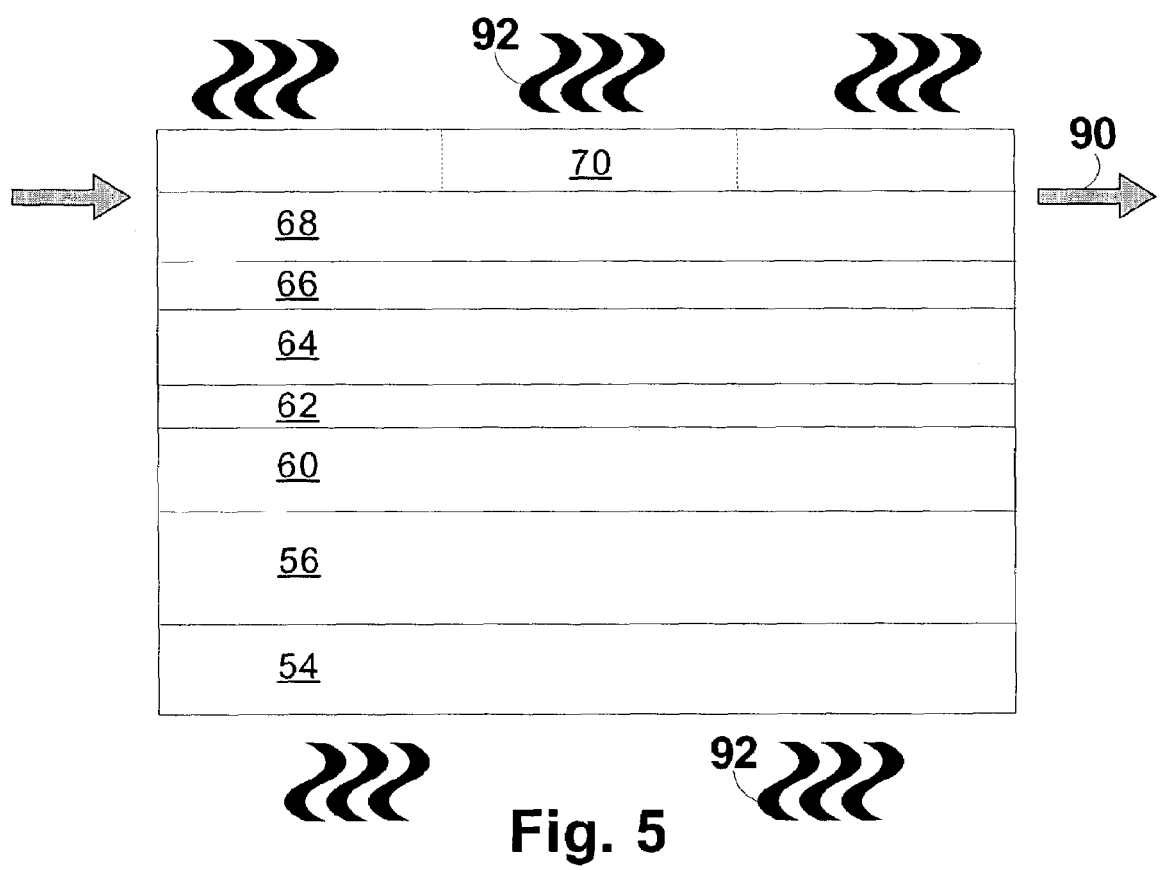
FIG. 5 shows a portion of the read element of FIG. 2 at a subsequent stage in the manufacturing process when the layers deposited to that point are subjected to another annealing process.

Once the exchange bias layer 70 is deposited, the stack can be subjected to this second annealing process as shown in FIG. 5. In this second annealing process, a magnetic field 90 in the range of 100 to 200 Oe is applied for 2 to 4 hours while the stack is baked 92 at a temperature of 220° to 240° C. Note that this temperature is somewhat less than the 240° to 280° C. used for the initial GMR anneal, but it is not a requirement that the second anneal be performed at a lower temperature. Of course, the temperature needs to be less than the blocking temperature of the annealed PtMn pinning layer 56 (e.g., 380° C.) so that there is no phase change of the PtMn of the pinning layer 56, because it is desired to keep the first pinned layer 60 at the previously set magnetization direction. As long as temperatures below that range are used for the second anneal, then the magnetization direction of the first pinned layer 60 should not be changed. Also, the magnetic field that is used during the second anneal is selected to align the magnetization of the free layer 68 without rotating the magnetization direction of the pinned layer 56. On the other band, low blocking temperature materials are not used for the exchange bias layer 70 because they tend to become unstable in high operational temperatures. Instead, the exchange bias material is selected to be such that it can be annealed at a temperature somewhat less than the GMR anneal, but much greater than operational conditions. Of course, the magnetic field 90 applied during this second anneal is at a direction orthogonal to the magnetic field 80 of the GMR field so that the magnetization direction of the free layer 68 is orthogonal to the magnetization direction of the first pinned layer 60. It can be appreciated that many of the benefits of the method of the present invention result from performing the initial GMR anneal in only the first pinned layer 60. Of course, the present invention applies both to GMR sensors having a single pinned layer and to synthetic designs in which the pinned "layer" is actually multi-layered. In the single pinned layer designs, it can be appreciated that no layers above the single pinned layer are affected by the GMR anneal, while in synthetic designs, it can be appreciated that only the first pinned layer is effected by the GMR anneal. While some inter-diffusion does occur between the seed layer 54 and the AFM pinning layer 56 and also between the AFM pinning layer 56 and the first pinned layer 60, this inter-diffusion is not believed to be problematic. On the other hand, prior art designs in which the GMR anneal was applied to the entire stack resulted in layer-to-layer inter-diffusion between each of the layers, which was not desirable. By reducing inter-diffusion damage between the GMR-producing layers, thermal stress is reduced, which can result in higher $\Delta R/R$ (potentially greater than 20% gain) and better lifetime performance.

In addition, it is desirable to be able to mill off the oxides and surface modify or smooth the surface prior to applying any of the remaining layers. In this manner, the large grain size of the PtMn in the AFM pinning layer 56 does not have an effect on the subsequent layers. Prior art approaches may have never performed the process in this manner for several reasons. First, a huge majority of commercial devices utilize abutted junction permanent magnets for longitudinal stabilization, so the second anneal for the PEB layer was never required. Secondly, it has historically been believed to be desirable to perform as many of the deposition processes as possible at one time without stopping to anneal because early deposition/vacuum chamber equipment did not allow for in situ annealing.

By doing the first GMR anneal early on in the process, a better interface is created between the free layer 68 and the exchange bias layer 70, so that the exchange effect between the PEB layer 70 and the free layer 68 is increased. In turn, this increases the stabilization in the free layer 68 and reduces Barkhausen noise. Further, by using high blocking temperature materials for the exchange bias layer 70, the present invention avoids the problems of an unstable free layer if low blocking temperature materials are used for the exchange bias layer 70.

Another advantage of the present invention is that it is believed that the device produced thereby will have a higher sensitivity ($\Delta R/R$) as a result of an improved and smoothed surface on the upper portion of the first pinned layer 60 as a result of the low energy ion milling and surface treatment.

Other advantages of the present invention are high thermal stability, large exchange fields, clean in situ exchange interface, and reduced thermal stress. Two process concepts utilized by the present invention are 1) in situ or ex situ anneal of just the pinned layer; and 2) in situ deposition of the exchange bias layer. The combination of these two processes allows for in situ formation of the exchange bias interface, which solves a significant problem for the implementation of exchange bias technology.

Another key advantage of this invention is that it moves the critical interface into the pin layer rather than between the free layer and the PEB layer. The use of interface smoothing and the low thermal stress will also allow for use of a thinner copper spacer layer, which enhances output. The free layer's magnetic properties will be improved as well due to the reduced thermal stress and not having to go through the transverse field GMR anneal. This means a higher sensitivity, which is required for higher density disk drives.

The anneal process enhancement is independent of whether it was longitudinally stabilized by a permanent magnet or exchange bias. The in situ deposition of the exchange bias layer guarantees perfect interface between the free layer and the bias layer as stated before, and since there is no mill, a perfect match in the thickness, which is the optimum design point. Therefore, the reduced roughness on the first pinned layer will enhance the GMR effect, reduce the interlayer exchange field, and improve the properties of the subsequent layers. This cannot be done with current techniques. The current method could potentially increase $\Delta R/R$ and low field sensitivity by up to 20%.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for producing a read element of a read/write head for a disk drive, comprising:
   depositing a pinning layer;
   depositing a pinned layer on top of the pinning layer to form a partial stack;
   annealing the partial stack while applying a magnetic field in a first direction;
   then depositing an electrically-conductive spacer layer on top of the partial stack after annealing the partial stack;
   depositing a free layer on top of the partial stack;
   depositing an exchange bias layer on top of the partial stack to form a stack; and
   annealing the stack while applying a magnetic field in a second direction, different than the first direction;
   wherein the pinned layer deposited before the first anneal is the first pinned layer in a synthetic pinned layer structure, wherein the remaining layers of the synthetic pinned layer structure are deposited subsequent to the first anneal.

2. A method as defined in claim 1, wherein the first anneal is performed in situ.

3. A method as defined in claim 1, wherein the first anneal is performed ex situ.

4. A method as defined in claim 1, further including milling the upper surface of the first pinned layer after the first anneal.

5. A method as defined in claim 4, wherein the milling is a low energy ion milling operation.

6. A method as defined in claim 4, further including smoothing the upper surface of the first pinned layer after milling the upper surface of the first pinned layer.

7. A method as defined in claim 1, further including smoothing the upper surface of the first pinned layer after the first anneal.

8. A method as defined in claim 7, wherein the smoothing includes ion beam oxidation.

9. A method as defined in claim 7, wherein the smoothing includes a gas clustering technique.

10. A method as defined in claim 1, further including etching away a portion of the exchange bias layer to leave a pattern of exchange bias material and then depositing insulator material where the portion of the exchange bias layer was etched away.

11. A method as defined in claim 10, wherein the etching is performed with reactive ions.

12. A method as defined in claim 1, wherein the exchange bias layer includes platinum manganese.

13. A method as defined in claim 1, wherein the exchange bias layer includes a high blocking temperature material that can be annealed at a temperature that is less than the temperature that would change the magnetization direction of the first pinned layer.

14. A method for producing a read element of a read/write head for a disk drive, comprising:
depositing a pinning layer;
depositing a pinned layer on top of the pinning layer to form a partial stack;
annealing the partial stack while applying a magnetic field in a first direction prior to depositing other layers;
then depositing an electrically-conductive spacer layer on top of the partial stack after annealing the partial stack; and
depositing a free layer;
wherein the pinned layer deposited before the anneal is the first pinned layer in a synthetic pinned layer structure, wherein the remaining layers of the synthetic pinned layer structure are deposited subsequent to the anneal.

15. A method as defined in claim 14, wherein the first anneal is performed in situ.

16. A method as defined in claim 14, wherein the first anneal is performed ex situ.

17. A method as defined in claim 14, further including milling the upper surface of the first pinned layer after the first anneal.

18. A method as defined in claim 17, wherein the milling is a low energy ion milling operation.

19. A method as defined in claim 17, further including smoothing the upper surface of the first pinned layer after milling the upper surface of the first pinned layer.

20. A method as defined in claim 14, further including smoothing the upper surface of the first pinned layer after the first anneal.

21. A method as defined in claim 20, wherein the smoothing includes ion beam oxidation.

22. A method as defined in claim 20, wherein the smoothing includes a gas clustering technique.

23. A method as defined in claim 14, further including depositing an exchange bias layer and annealing the stack while applying a magnetic field in a second direction, different than the first direction.

24. A method as defined in claim 23, further including etching away a portion of the exchange bias layer to leave a pattern of exchange bias material and then depositing insulator material where the portion of the exchange bias layer was etched away.

25. A method as defined in claim 24, wherein the etching is performed with reactive ions.

26. A method as defined in claim 23, wherein the exchange bias layer includes platinum manganese.

27. A method as defined in claim 23, wherein the exchange bias layer includes a high blocking temperature material that can be annealed at a temperature that is less than the temperature that would change the magnetization direction of the first pinned layer.

28. A method for producing a read element of a read/write head for a disk drive, comprising:
depositing a pinning layer;
depositing a pinned layer;
setting the magnetization direction of the pinned layer;
wherein the pinned layer deposited before the magnetization direction is set is the first pinned layer in a synthetic pinned layer structure, wherein the remaining layers of the synthetic pinned layer structure are deposited subsequent to the setting of the magnetization direction of the first pinned layer;
then depositing an electrically-conductive spacer layer on top of the pinned layer after setting the magnetization direction thereof;
depositing a free layer on top of the spacer layer;
depositing an exchange bias layer; and
setting the magnetization direction of the free layer.

29. A method as defined in claim 28, wherein the setting of the magnetization direction of the first pinned layer is performed in situ.

30. A method as defined in claim 28, wherein the setting of the magnetization direction of the first pinned layer is performed ex situ.

31. A method as defined in claim 28, further including milling the upper surface of the first pinned layer after the setting of the magnetization direction of the first pinned layer.

32. A method as defined in claim 31, wherein the milling is a low energy ion milling operation.

33. A method as defined in claim 31, further including smoothing the upper surface of the first pinned layer after milling the upper surface of the first pinned layer.

34. A method as defined in claim 28, further including smoothing the upper surface of the first pinned layer after the setting of the magnetization direction of the first pinned layer.

35. A method as defined in claim 34, wherein the smoothing includes ion beam oxidation.

36. A method as defined in claim 34, wherein the smoothing includes a gas clustering technique.

37. A method as defined in claim 28, further including etching away a portion of the exchange bias layer to leave a pattern of exchange bias material and then depositing insulator material where the portion of the exchange bias layer was etched away.

38. A method as defined in claim 37, wherein the etching is performed with reactive ions.

39. A method as defined in claim 28, wherein the exchange bias layer includes platinum manganese.

40. A method as defined in claim 28, wherein the exchange bias layer includes a high blocking temperature material that can be annealed at a temperature that is less than the temperature that would change the magnetization direction of the first pinned layer.

41. A method for producing a read element of a read/write head for a disk drive, comprising:

depositing a pinning layer;

depositing a first pinned layer of a synthetic pinned layer structure;

annealing the pinning layer while applying a magnetic field in a first direction to the first pinned layer, to set the magnetization direction of the first pinned layer in the first direction;

milling the upper surface of the first pinned layer after the setting of the magnetization direction of the first pinned layer;

smoothing the upper surface of the first pinned layer after milling the upper surface of the first pinned layer;

then depositing the remaining layers of the synthetic pinned layer structure;

depositing an electrically-conductive spacer layer;

depositing a free layer;

depositing an exchange bias layer;

annealing the exchange bias layer while applying a magnetic field in a second direction, different than the first direction, to the free layer, to set the magnetization direction of the free layer in the second direction; and etching away a portion of the exchange bias layer to leave a pattern of exchange bias material and then depositing insulator material where the portion of the exchange bias layer was etched away.

42. A method as defined in claim 41, wherein the annealing of the first pinned layer and the setting of the magnetization direction of the first pinned layer is performed in situ.

43. A method as defined in claim 41, wherein the annealing of the first pinned layer and the setting of the magnetization direction of the first pinned layer is performed ex situ.

* * * * *

UNITED STATES PATENT AND TRADEMARK OFFICE
CERTIFICATE OF CORRECTION

| | | |
|---|---|---|
| PATENT NO. | : 6,998,061 B1 | Page 1 of 1 |
| APPLICATION NO. | : 10/342686 | |
| DATED | : February 14, 2006 | |
| INVENTOR(S) | : Ralph W. Cross | |

It is certified that error appears in the above-identified patent and that said Letters Patent is hereby corrected as shown below:

Column 7, lines 14 - 50 (beginning with the words "drive operations are re-initiated.") is a duplicate text of column 8, lines 61 - 67 through column - 9, lines 1 - 32.

Column 11, line 10 (beginning with the words "It can be") should begin with a new paragraph.

Signed and Sealed this

Eighteenth Day of July, 2006

JON W. DUDAS
*Director of the United States Patent and Trademark Office*